United States Patent [19]

Crass et al.

[11] Patent Number: 4,983,447

[45] Date of Patent: Jan. 8, 1991

[54] BIAXIALLY ORIENTED OPAQUE POLYOLEFIN MULTI-LAYER FILM

[75] Inventors: Guenther Crass, Taunusstein; Siegfried Janocha, Wiesbaden; Lothar Bothe, Mainz-Gonsenheim, all of Fed. Rep. of Germany

[73] Assignee: Hoechst Aktiengesellschaft, Frankfurt am Main, Fed. Rep. of Germany

[21] Appl. No.: 95,448

[22] Filed: Sep. 11, 1987

[30] Foreign Application Priority Data

Sep. 13, 1986 [DE] Fed. Rep. of Germany ....... 3631231

[51] Int. Cl.$^5$ .................. B32B 27/08; B29C 45/16
[52] U.S. Cl. ................... 428/216; 428/349; 428/447; 428/331; 428/330; 428/516; 428/906; 264/211.12; 427/39
[58] Field of Search ............... 428/216, 349, 447, 331, 428/330, 516

[56] References Cited

U.S. PATENT DOCUMENTS

| | | | |
|---|---|---|---|
| 3,914,521 | 10/1975 | Beatty et al. | 428/461 |
| 4,302,504 | 11/1981 | Lansbury et al. | 428/332 |
| 4,303,708 | 12/1981 | Gebhardt et al. | 428/35 |
| 4,343,852 | 8/1982 | Isaka et al. | 428/216 |
| 4,419,411 | 12/1983 | Park | 428/516 |
| 4,477,506 | 10/1984 | Wang | 428/172 |
| 4,565,739 | 1/1986 | Clauson et al. | 428/349 |
| 4,590,125 | 5/1986 | Balloni et al. | 428/349 |
| 4,595,625 | 6/1986 | Crass et al. | 428/215 |
| 4,604,324 | 8/1986 | Nahmias et al. | 428/349 |
| 4,666,772 | 5/1987 | Schinkel et al. | 428/330 |
| 4,692,379 | 9/1987 | Keung et al. | 428/349 |
| 4,734,317 | 3/1988 | Bothe et al. | 428/215 |

FOREIGN PATENT DOCUMENTS

| | | |
|---|---|---|
| 0069526 | 1/1983 | European Pat. Off. . |
| 0071349 | 2/1983 | European Pat. Off. . |
| 0078535 | 5/1983 | European Pat. Off. . |

OTHER PUBLICATIONS

Ullmanns Encyklopaedie der Technischen Chemie, 4th Ed., vol. 2, pp. 539–553.

Primary Examiner—P. C. Sluby
Attorney, Agent, or Firm—Foley & Lardner, Schwartz, Jeffery, Schwaab, Mack, Blumenthal & Evans

[57] ABSTRACT

An opaque polyolefin film having a base layer composed essentially of propylene polymers and having sealing layers present on both sides, composed essentially of sealable olefin polymers, is disclosed. From about 0.2% to 1.5% by weight, relative to the layer of polydialkylsiloxane is incorporated in one of the two sealing layers, and this layer has not been subjected to corona treatment. The other sealing layer has been subjected to corona treatment and has polydialkylsiloxane, not incorporated, but present on the outer surface of this layer, the polydialkylsiloxane having been transferred to this layer by contact between the sealing layer in which polydialkylsiloxane is incorporated. The relative polydialkylsiloxane occupancy of this layer, which is determined by means of ESCA spectroscopy, is not more than 15. The three-layer opaque polyolefin film is prepared by the coextrusion process. It is particularly suitable for use as a packaging film on high-speed packaging machines.

19 Claims, 2 Drawing Sheets

BIAXIALLY ORIENTED OPAQUE POLYOLEFIN MULTI-LAYER FILM

BACKGROUND OF THE INVENTION

The invention relates to a biaxially oriented opaque polyolefin multi-layer film which can be sealed on both sides and comprises a base layer and two top layers. The base layer is composed essentially of a propylene polymer with the addition of an inorganic pigment. The invention also relates to a process for the production of the film and to its use.

For many applications, particularly for packaging food, sufficiently opaque, grease-repellent and water-vapor proof films are required.

In high-speed packaging machines such as, for example, horizontal forming, filling and sealing machines and, in particular, also for packaging chocolate bars, films are required which, on the one hand, can be sealed on both sides and, on the other hand, have good slip properties in high-speed packaging machines and additionally show good printability, even after prolonged storage of the film.

A biaxially oriented polyolefin film which can be sealed on both sides and has three layers is disclosed in U.S. Pat. No. 4,419,411. In the case of this film, an additive combination is incorporated in both of the sealing layers. They each contain 0.15% to 0.4% by weight of polysiloxane and 0.05% to 0.5% by weight of silicon dioxide, the percentages by weight relating in each case to the sealable layer. The base layer is composed of polypropylene (as the main component) and contains a small amount of a monocarboxamide. Part of the amide migrates from the base layer into the two sealing layers and onto the surfaces thereof (external faces), so that polysiloxane, silicon dioxide and the monocarboxamide are present in incorporated form in each sealing layer, and the monocarboxamide is also present on the outer faces of the two sealing layers. The polyolefin multi-layer film described is stated to have a particularly low coefficient of friction. However, this film suffers in particular from the disadvantage that it is not printable.

In European Patent No. 0,004,633 an opaque multi-layer film is described, which comprises a polypropylene base layer modified with 5% to 15% by weight of a pigment and at least one sealing layer of a random $C_2/C_3$ copolymer. During stretch orientation the polymer matrix tears open at the grain boundaries of the pigments; the hollow spaces, so-called vacuoles, thus produced cause a considerable reduction of film density and, as a consequence, opacity which imparts an attractive pearlescent appearance to the entire film.

To improve processability, the base layer of this multi-layer film can also contain migrating lubricants according to U.S. Pat. No. 4,419,411, for example, fatty acid esters or fatty acid amides, which accumulate at the film surface to form a lubricating film. The processing behavior of the film in the above-described high-speed packaging machines is increasingly improved upon prolonged storage, due to the formation of this lubricating film, at the same time, however, the adherence of printing ink is reduced to a considerable extent after a storage time of only 4 weeks.

SUMMARY OF THE INVENTION

Accordingly, it is an object of the invention to provide a biaxially oriented opaque polyolefin film which is composed of three layers and can be sealed on both sides, which has the above-mentioned important characteristics.

It is a further object of the invention to provide a biaxially oriented opaque polyolefin which is readily printable.

It is yet another object of the invention to provide a polyolefin multi-layer film which is readily sealable on both sides and has excellent running properties and good printability.

These and other objects of the invention are achieved by providing a polyolefin multi-layer film of the above-mentioned type, in which (a) one surface layer essentially comprises a polyolefinic sealable raw material and contains, in incorporated form, a polydialkylsiloxane as a lubricant and has not been subjected to corona treatment and (b) the opposite surface layer essentially comprises a polyolefinic sealable raw material and has, on its outer surface, polydialkylsiloxane as a lubricants in a relative occupancy of not more than 15, as determined with the aid of ESCA spectroscopy.

DETAILED DESCRIPTION OF THE PREFERRED EMBODIMENTS

Figure 1:
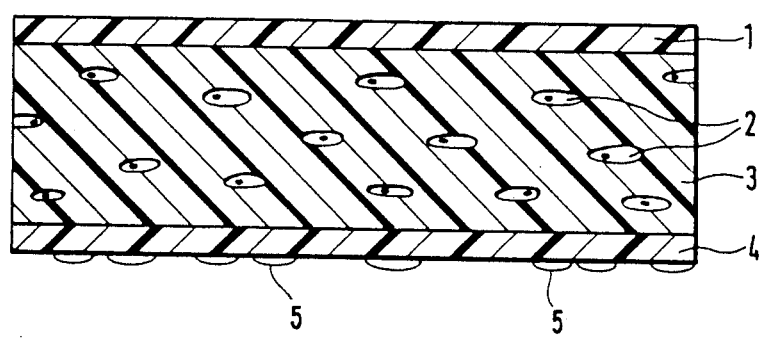
FIG. 1 is a cross-sectional view of the multi-layer film of the invention before it is wound on a roll

The new polyolefin film is based on a number of inventive considerations and actions. The effect of the polydialkylsiloxane not being incorporated in one of the two sealing layers, but present as a coating (on the outer surface thereof) and of this sealing layer having been subjected to corona treatment before being coated with polydialkylsiloxane is that the film according to the invention is printable on this layer. At the same time, the multi-layer film also possesses all the other important characteristics mentioned above. Thus, it is possible, in a simple manner (namely by contact between one sealing layer in which polydialkylsiloxane has been incorporated with the outer surface of the other of the two sealing layers) to combine corona treatment and the presence of polydialkylsiloxane in one sealing layer and to achieve jointly the effects thereby hoped for (good printability, good slip properties and good sealability), without having to accept any disadvantageous effects on further important characteristics.

The amount of polydialkylsiloxane transferred to the outer face of a sealing layer constitutes only a relatively small fraction of the polydialkylsiloxane incorporated in the other sealing layer. Accordingly, the amount of polydialkylsiloxane added to the olefin polymer of a sealing layer, from about 0.5% to 3% by weight, preferably from about 0.8% to 2% by weight (the percentages by weight relating to the total weight of the layer), is not substantially decreased by the transfer mentioned.

The said occupancy with polydialkylsiloxane is effected by contact between the two sealing layers. Contact between the sealing layers exists, for example, when the film, after being prepared, is wound up at the temperature then prevailing (as a rule approximately room temperature), because in the course of this the two sealing layers are placed one above the other with close mutual contact. The transfer intended is, in addition, also promoted by the fact that the two sealing layers are in contact at the pressure generated by winding up. It has been found that the transfer of polydialkylsiloxane takes place after only a short period of contact and that the required occupancy is present.

If the value, determined by means of ESCA spectroscopy (ESCA = Electron Spectroscopy for Chemical Analysis), of relative occupancy of the outer face is more than 15, there is already so much polydialkylsiloxane present that problems of process technology could arise when the film is used. On the other hand, the slip properties of the film can be impaired at very low values. Accordingly, the relative polydialkylsiloxane occupancy is preferably about 2 to 10.

The polydialkylsiloxane incorporated in one of the two sealing layers has lateral groups with 1 to 6 carbon atoms and has a viscosity of at least 100 mm$^2$/second at 25° C., preferably from about 1,000 to 100,000 mm$^2$/second and especially from about 5,000 to 50,000 mm$^2$/second (the viscosity range of, for example, from about 1,000 to 100,000 mm$^2$/second at 25° C. corresponds to an average molecular weight of about 25,000 to 103,000 in the case of polydimethylsiloxane). Polydimethylsiloxane has proved to be particularly suitable.

The base layer of the multi-layer film according to the invention is composed of a propylene polymer which predominantly comprises propylene and has a melting point of about 140° C. or higher, preferably from about 150° to 170° C. Isotactic polypropylene having an n-heptane-soluble proportion of about 15% by weight or less, copolymers of ethylene and propylene having an ethylene content of about 10% by weight or less, and copolymers of propylene and $C_4$–$C_8$ α-olefins having an α-olefin content of about 10% by weight or less constitute preferred propylene polymers for the base layer, isotactic polypropylene being particularly preferred.

In general, the propylene polymer of the base layer has a melt flow index of from about 0.5 g/10 minutes to 10 g/10 minutes, preferably from about 1.5 g/10 minutes to 4 g/10 minutes, at 230° C. and at a loading of 2.16 kg (DIN 53,735).

The base layer contains an additive which is incompatible with the polymer and comprises, in particular, inorganic particles such as alkaline earth metal carbonates, preferably calcium carbonate and/or silicon dioxide, titanium dioxide and barium sulfate. These particles usually have an average particle diameter from about 2 to 8 μm. However, an organic incompatible additive, preferably polystyrene, polymethyl methacrylate, polytetrafluoroethylene and/or copolymers of these compounds may equally advantageously be included in the base layer in a dispersed state. The incompatible additive is appropriately used in a concentration from about 5% to 35% by weight, particularly from about 10% to 20% by weight, relative to the base layer.

In this connection "incompatible" signifies that the polymeric organic component has a melting point and/or a natural stretching ratio which differ from the melting point and/or the natural stretching ratio of the polypropylene and that the polymer matrix is torn open in the stretching process and, as a result, vacuoles are formed.

The polypropylene raw material usually contains catalyst residues in the form of chloride contaminants. Since these are unwanted in the further processing, industrial polypropylene raw materials additionally contain so-called "chloride scavengers", in particular calcium stearate. Together with the chloride, calcium stearate forms free stearic acid and calcium chloride. However, free stearic acid and calcium stearate are extremely disadvantageous to the printability of a film, since they act as migrating lubricants, similarly to the fatty acid esters and fatty acid amides.

If the inorganic pigment used comprises calcium carbonate it is not necessary to add a chloride scavenger, because, even being a salt of a weak acid, it is capable of binding chloride.

Therefore, in the preferred embodiment a polypropylene raw material is used which contains calcium carbonate as an inorganic pigment and can thus be free from migrating chloride scavengers.

The sealing layers of the multi-layer film according to the invention are composed of sealable olefinic polymers. Suitable olefin polymers are ethylene homopolymers, such as LDPE, LLDPE and HDPE, copolymers formed from ethylene and propylene or ethylene or propylene and butylene or another α-olefin having 5 to 10 carbon atoms, terpolymers formed from ethylene, propylene and butylene or another α-olefin having 5 to 10 carbon atoms, or mixtures of these polymers.

It is preferable to employ ethylene/propylene copolymers, ethylene/butylene copolymers, propylene/butylene copolymers, ethylene/propylene/butylene terpolymers or mixtures of these polymers. Olefin polymers which are particularly preferred for the sealing layers are ethylene/propylene copolymers having propylene as the main component and an ethylene content of from about 2% to 10% by weight (relative to the copolymer), propylene/butylene copolymers having propylene as the main component and a butylene content of from about 0.5% to 25% by weight (relative to the copolymer) and ethylene/propylene/butylene terpolymers having propylene as the main component and from about 0.5% to 7% by weight of ethylene and from 5% to 30% by weight of butylene (relative to the terpolymer) and also mixtures of these polymers.

The olefin polymer of the sealing layers has a lower melting point than the propylene polymer of the base layer. The melting point of the olefin polymer is, in general, within the range from about 80° to 160° C., preferably from about 100° to 140° C.

The melt flow index of the olefin polymer is higher than that of the propylene polymer of the base layer. The olefin polymer for the sealing layers has a melt flow index of, in general, from about 1 to 12 g/10 minutes, preferably from about 3 to 9 g/10 minutes, at 230° C. and a loading of 2.16 kg (DIN 53, 735).

For the corona treatment, which can be carried out by one of the known methods, it is preferable to use a procedure in which the film is passed between two conductor elements acting as electrodes, and to apply, between the electrodes, a voltage, in most cases an alternating voltage, sufficiently high (about 10,000 volts and 10,000 Hertz) to enable spray or corona discharges to take place. As a result of the spray or corona discharges, the air above the surface of the film becomes ionized and combines with the molecules on the surface of the film, so that polar incorporations are formed in the essentially nonpolar polymer matrix. In accordance with the invention, of the two sealing layers, only the layer in which the olefin polymer does not contain polydialkylsiloxane, i.e., the sealing layer in which polydialkylsiloxane has not been incorporated, is subjected to corona treatment.

In order to improve even further certain properties of the polyolefin film according to the invention, it is possible for both the base layer and the two sealing layers to contain appropriate additives in an effective amount in each case, preferably antistatic agents, antiblocking agents, lubricants, stabilizers and/or low-molecular resins, which are compatible with the polymers of the base layer and of the sealing layers.

Preferred antistatic agents are alkali metal alkanesulfonates, polyether-modified polydialkylsiloxanes, i.e., ethoxylated and/or propoxylated polydialkylsiloxanes and/or the essentially linear and saturated, aliphatic, tertiary amines containing an aliphatic radical having 10 to 20 carbon atoms and substituted by two hydroxyalkyl-($C_1$–$C_4$) groups, among which N,N-bis-(2-hydroxyethyl)-alkylamines having $C_{10}$–$C_{20}$ groups, preferably $C_{12}$–$C_{18}$ groups, as the alkyl groups are particularly suitable. The effective amount of antistatic agent is within the range from about 0.05% to 3% by weight, relative to the layer. In the event that polyether-modified polysiloxane is employed, this is only added to the polymer for the base layer and/or to the polymer of the layer, out of the two sealing layers, which is intended as a layer in which polydialkylsiloxane has been incorporated.

Suitable antiblocking agents are inorganic additives, such as silicon dioxide, calcium carbonate, magnesium silicate, aluminum silicate, calcium phosphate and the like, nonionic surfactants, anionic surfactants and/or incompatible organic polymers, such as polyamides, polyesters, polycarbonates, and the like. The effective amount of anti-blocking agent is within the range from about 0.1% to 2% by weight, relative to the layer.

Stabilizers which can be employed are the customary compounds which have a stabilizing action on ethylene, propylene and other $\alpha$-olefin polymers. The effective amount is, in general, from about 0.1% to 2% by weight, relative to the layer.

The low-molecular resin recommended is a natural or synthetic resin having a softening point of from about 60° to 180° C., preferably from about 80° to 130° C. (determined according to DIN 1995-U 4). Of the numerous low-molecular resins, the hydrocarbon resins are preferred, specifically petroleum resins, styrene resins, cyclopentadiene resins and terpene resins (these resins are described in Ullmanns Enzyklopaedie der Techn. Chemie, *Ullmann's Encyclopedia of Industrial Chemistry,* 4th Edition, Volume 2, pages 539 to 553).

The petroleum resins are hydrocarbon resins prepared by polymerizing deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. Styrene resins are low-molecular homopolymers of styrene or copolymers of styrene with other monomers, such as $\alpha$-methyl-styrene, vinyltoluene and butadiene. The cyclopentadiene resins are cyclopentadiene homopolymers or cyclopentadiene copolymers obtained from coal tar distillates and fractionated petroleum gas. These resins are prepared by subjecting the materials containing cyclopentadiene to a high temperature for a very long time. Depending on the reaction temperature, it is possible to obtain dimers, trimers or high polymers. The terpene resins are polymers of terpenes, i.e., hydrocarbons of the formula $C_{10}H_{16}$, which are present in nearly all the essential oils and oil-containing resins of plants, and phenol-modified terpene resins. Special examples of terpenes are $\alpha$-pinene, $\beta$-pinene, dipentene, limonene, myrcene, bornylene, camphene and similar terpenes. The hydrocarbon resins can also comprise the so-called modified hydrocarbon resins. Modification is generally effected by reacting the raw materials before polymerization, by introducing special monomers or by reacting the polymerized product, the reactions carried out being, in particular, hydrogenations or partial hydrogenations.

The hydrocarbon resins employed are preferably styrene homopolymers, styrene copolymers, cyclopentadiene homopolymers, cyclopentadiene copolymers and/or terpene polymers having a softening point in each case of from about 60° to 180° C., preferably from about 80° to 130° C. (in the case of the unsaturated polymers the hydrogenated product is preferred).

The effective amount of low-molecular resin is from about 3% to 15% by weight, preferably from about 5% to 10% by weight, relative to the layer.

It has proved to be particularly advantageous to combine the low-molecular resin with a propylene homopolymer having a melting point of up to about 165° C., preferably with an isotactic polypropylene, in an amount of from about 3% to 15% by weight, preferably from about 5% to 10% by weight, relative to the layer, it being preferable to employ the resin and the propylene homopolymer in approximately equal amounts in each case.

In accordance with a preferred embodiment of the polyolefin multi-layer film according to the invention, at least one sealing layer contains from about 3% to 15% by weight, preferably from about 5% to 10% by weight, of the said natural or synthetic resins having a softening point of from about 80° C. to 130° C., and from about 3% to 15% by weight, preferably from about 5% to 10% by weight of a propylene homopolymer having a melting point of up to about 165° C., the percentages by weight relating to the layers.

In accordance with a further preferred embodiment, the base layer (in which the main component is a propylene homopolymer) and/or at least one sealing layer contain an N,N-bis-(2-hydroxyethyl)-($C_{10}$–$C_{20}$)-alkylamine.

Obviously, the two sealing layers of the polyolefin film according to the invention can be composed of identical or different polymers.

Insofar as it is suitable, the base layer and/or the sealing layers also contain the other additives mentioned above, preferably lubricants and antiblocking agents, in each case in an effective amount.

The thickness of the polyolefin multi-layer film according to the invention can vary within wide limits and depends especially on the intended use. Its total thickness is, in general, from about 15 to 60 $\mu$m, preferably from about 20 to 50 $\mu$m. The sealing layers, which generally have the same thickness, are from about 0.2 to 2 $\mu$m, preferably from about 0.4 to 1.0 $\mu$m, thick. The thickness of the base layer constitutes about 50% to 90% of the total thickness.

The preparation of the polyolefin film according to the invention, which is composed of three layers, is effected by the known coextrusion process. Within the scope of this process the procedure followed is to coextrude the melts corresponding to the individual layers of the film through a flat die, to cool the film obtained by coextrusion in order to solidifiy it, to stretch (orient) the film biaxially, to heat-set the biaxially stretched film and to subject to corona treatment the sealing layer scheduled for corona treatment. The biaxial stretching (orientation) can be carried out simultaneously or successively, successive biaxial stretching, in which stretching is first carried out longitudinally (i.e., in machine direction) and then transversely (i.e., transversely to machine direction), being preferred. Consequently, as in the conventional coextrusion process, the polymers or the polymer mixtures of the individual layers are first compressed or plastified in an extruder. The melts are then forced simultaneously through a flat die (slot die), and the multi-layer film which has been forced out is cooled and solidified on one or more rolls which are kept at about 30° to 50° C. by cooling. The film thus obtained is then stretched longitudinally and transversely to the direction of extrusion, which results in orientation of the molecular chains. It is preferable to stretch in a ratio of from about 4:1 to 7:1 in the longitudinal direction and preferable to stretch in a ratio of from about 8:1 to 10:1 in the transverse direction. The longitudinal stretching is carried out at a film temperature of, preferably, from about 120° to 140° C., and the transverse stretching is preferably carried out at from about 160° to 175° C. It will be preferable to carry out the longitudinal stretching by means of two rollers running at different speeds, corresponding to the stretching ratio desired, and to carry out the transverse stretching by means of an appropriate tenter frame. From longitudinal stretching a vacuole structure results, which leads to the pearlescent lustre of the film surface. In the process, the specific gravity of the multi-layer film must drop to less than about 90%, preferably to about 50% to 80%, of the specific gravity of the multi-layer film prior to stretching and it reaches values equal to or less than about 0.80 g/cm$^3$, in particular values of from about 0.5 to 0.75 g/cm$^3$.

After the film has been stretched biaxially it is heat-set (subjected to heat treatment). In this process the film is kept at a temperature of from about 150° to 160° C. for about 0.5 to about 10 seconds. The corona treatment is preferably carried out by means of an alternating voltage of about 10,000 volts and 10,000 Hertz. The film prepared in this way is wound up in a customary manner by means of a take-up unit.

The polyolefin multi-layer film according to the invention is particularly suitable for use as a packaging film on high-speed packaging machines. This is because it possesses all the important properties demanded from polyolefin films used on high-speed machines. In particular, it can be sealed on both sides and has excellent running characteristics and at the same time good printability which remains unchanged, even after a storage time of four weeks.

Due to its attractive appearance the film can particularly advantageously be used for the production of opaque packages, particularly for food which is sensitive to the action of light. It can, however, also be used for other applications, in which opaque heat-sealable plastic films of pearlescent lustre are required.

The invention will be illustrated in greater detail by the following examples and the accompanying figure of drawing, which are intended to be illustrative only and in no sense limiting.

The examples and comparative examples below relate in each case to a biaxially oriented (longitudinal stretching ratio 5:1, transverse stretching ratio 10:1) polyolefin film having a base layer and two sealing layers, the base layer being composed of an isotactic polypropylene having a fraction soluble in n-heptane of 5% by weight, a melting point of 165° C. and a melt flow index of 2 g/10 minutes at 230° C. and 2.16 kg loading (DIN 53,735) as the main component. The base layer contains 8% by weight of finely divided calcium carbonate particles having an average particle size of 2.4 $\mu$m. The base layer is about 19 $\mu$m thick, and the two sealing layers surrounding the base layer are each about 1 $\mu$m thick. The three-layer polyolefin films have been prepared by the known coextrusion process.

Example 1

One sealing layer is composed of a (random) ethylene/propylene copolymer containing 4.5% by weight of ethylene, to which 0.8% by weight of polydimethylsiloxane having a viscosity of 30,000 mm$^2$/second at 25° C. has been added. This sealing layer has thus been formed from 99.2% by weight of the said copolymer (composed of 95.5% by weight of propylene and 4.5% by weight of ethylene) and 0.8% by weight of the said polysiloxane. The other sealing layer is composed of the same ethylene/propylene copolymer and contains no incorporated polysiloxane. This sealing layer has been subjected to corona treatment. After the three-layer polyolefin film has been prepared and wound up, a relative polydimethylsiloxane occupancy of 4 on the corona-treated sealing layer has been determined by means of ESCA spectroscopy.

Comparative Example 1

Sealing layers according to the example given in European Patent No. 0,004,633, i.e., without the addition of a lubricant, were used.

Comparative Example 2

Sealing layers according to the example given in European Patent No. 0,004,633, i.e., without the addition of a lubricant, were used. The base layer contained 8% by weight of calcium carbonate and, additionally, 0.5% by weight of stearic acid amide as a migrating lubricant.

Comparative Example 3

Sealing layers according to the example of European Patent No. 0,004,633 were used, but each sealing layer contained 0.5% by weight of polydimethylsiloxane.

Comparative Example 4

Sealing layers according to the example of European Patent No. 0,004,633 were used, however, without the addition of a lubricant. Instead, polydimethylsiloxane was added to the polymer of the base layer, in an amount of 0.8% by weight, relative to the total weight of the base layer.

Determination of the relative polydialkylsiloxane occupancy

The relative polydialkylsiloxane occupancy of the surface of the corona-treated sealing layer was determined by means of ESCA spectroscopy (ESCA = Electron Spectroscopy for Chemical Analysis). ESCA spectroscopy is a surface-specific method of analysis in which the kinetic energy of the electrons emitted by a surface under the influence of X-rays is measured. The determination was carried out using samples of the finished film, wound up in a customary manner, after it had remained in the wound-up state at room temperature for at least 60 minutes. The lines of the ESCA spectrum are designated by the energy levels emitted.

The area under an ESCA line is proportional to the concentration of the appropriate element on the surface. The relative polydialkylsiloxane occupancy of the surface (RSO) is accordingly calculated by quoting the ratio of the area of the Si2p$_{3/2}$ to the Cls$_{1/2}$ line by means of the equation:

$$RSO = 40 \frac{F_{Si2p3/2}}{F_{Cls1/2}}$$

where $F_{Si2p3/2}$ is the area under the Si2p$_{3/2}$ line and $F_{Cls1/2}$ is the area under the Cls$_{1/2}$ line. The factor 40 is a relative signal intensity factor.

The determinations were carried out using the ESCA instrument made by McPherson, U.S.A., "ESCA 36 photoelectronspectrometer".

Determination of seal strength

Two strips 15 mm wide were laid one above the other and were sealed at 130° C., a sealing time of 0.1 second and a sealing pressure of 0.15 bar. The seal strength was determined by the T-peel-method.

The properties of the three-layer polyolefin films of the examples and comparative examples are collated in the table below.

As the results show, the three-layer polyolefin films according to the invention are markedly superior to those of the state of the art. The films according to the invention alone fulfill the high requirements in respect of sealability on both sides and running characteristics (runability on the machine) while having at the same time good printability, and they are thus distinguished by universal applicability on high-speed packaging machines.

The signs in the table signify:
+ + excellent
+ good
+ — sufficient
— poor
— — very poor Sides 1 and 2 denote the sealable surfaces, side 1 being corona-treated, and side 2 untreated.

Figure 2:
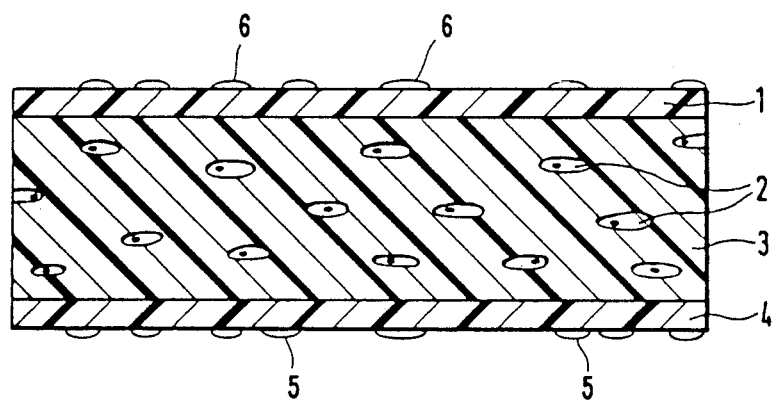
FIG. 2 is cross-sectional view of the multilayer film of the invention after it has been wound on a roll.

In FIGS. 1 and 2 reference numeral 1 denotes the corona-treated surface layer which is composed of a polyolefinic sealable raw material without a lubricant, reference numeral 2 denotes the vacuoles, 3 the base layer and 4 the surface layer which has not been corona-treated and is composed of a polyolefinic sealable raw material, modified with polydialkylsiloxane. Reference numeral 5 denotes polydialkylsiloxane on the surface of layer 4. Reference numeral 6 denotes polydialkylsiloxane on the surface of layer 1 after the film has been corona discharge treated and wound on a roll.

TABLE

| | Sealability | | Printability after 4 weeks storage | Machine Runability on Packaging |
|---|---|---|---|---|
| | Side 1 | Side 2 | Side 1 | Machines |
| Example | + + | + + | + + | + + |
| Comparative Example 1 | + + | + + | + + | + — |
| Comparative Example 2 | + + | + + | — | + |
| Comparative Example 3 | — — | + + | + | — — |
| Comparative Example 4* | + + | + + | + + | — — |

*The value determined with the aid of ESCA-spectroscopy for the relative siloxane occupancy of the surface after two weeks storage is 0.

What is claimed is:

1. A biaxially oriented opaque polyolefin multilayer film which can be sealed on both sides, comprising a base layer and two surface layers, one on each side of the base layer, the base layer comprising a propylene polymer with an additive that is incompatible with the propylene polymer, a first surface layer comprising a polyolefinic sealable raw material containing a polydialkylsiloxane incorporated within the layer as a lubricant, and a second surface layer consisting essentially of a sealable polyolefinic material having, on its outer surface, polydialkylsiloxane as a lubricant, in a relative occupancy of not more than about 15, as determined with the aid of ESCA spectroscopy, wherein said second surface layer has been subjected to corona discharge and is printable.

2. A polyolefin film as claimed in claim 1, wherein the inorganic pigment contained in the base layer comprises a silicate, an alkaline earth metal carbonate, titanium dioxide, or barium sulfate or mixtures thereof, in a concentration of from about 5% to 35% by weight.

3. A polyolefin film as claimed in claim 2, wherein the alkaline earth metal carbonate comprises calcium carbonate.

4. A polyolefin film as claimed in claim 1, wherein the base layer does not contain any migrating chloride scavengers.

5. A polyolefin film as claimed claim 1, wherein the amount of incorporated polydialkylsiloxane is from about 0.5% to 3% by weight.

6. A polyolefin film as claimed in claim 5, wherein the amount of incorporated polydialkylsiloxane is from about 0.8% to 2% by weight relative to the layer.

7. A polyolefin film as claimed in claim 1, wherein the relative polydialkylsiloxane occupancy is from about 2 to 10.

8. A polyolefin film as claimed in claim 1, wherein the polydialkylsiloxane is a polydimethylsiloxane having a viscosity of from about 1,000 to 100,000 mm$^2$/s at 25° C.

9. A polyolefin film as claimed in claim 1, wherein the olefin polymer of the sealing layers comprises an ethylene/propylene copolymer, an ethylene/butylene copolymer, a propylene/butylene copolymer, an ethylene/propylene/butylene terpolymer or a mixture of at least two of these polymers.

10. A polyolefin film as claimed in claim 1, wherein at least one sealing layer additionally comprises from about 3% to 15% by weight relative to the layer of a low-molecular weight hydrocarbon resin having a softening point of from about 80° to 130° C.

11. A polyolefin film as claimed in claim 10, wherein the at least one sealing layer additionally comprises from about 3% to 15% by weight relative to the layer of a propylene homopolymer having a melting point of up to about 165° C.

12. A polyolefin film as claimed in claim 1, wherein the total thickness is from about 15 to 60 μm and each sealing layer is from about 0.3 to 2 μm thick.

13. A polyolefin film as claimed in claim 1, wherein the specific gravity is less than about 0.8 g/cm³.

14. A polyolefin film as claimed in claim 5, wherein the inorganic pigment contained in the base layer comprises a silicate, an alkaline earth metal, carbonate, titanium dioxide, or barium sulfate or mixtures thereof, in a concentration of from about 5% to 35% by weight.

15. A polyolefin film as claimed in claim 14, wherein the olefin polymer of the sealing layers comprises is an ethylene/propylene copolymer, an ethylene/butylene copolymer, a propylene/butylene copolymer, an ethylene/propylene/butylene terpolymer or a mixture of at least two of these polymers.

16. A polyolefin film as claimed in claim 15, wherein at least one sealing layer comprises an ethylene/propylene copolymer, an ethylene/butylene copolymer, a propylene/butylene copolymer, an ethylene/propylene/butylene terpolymer or a mixture of at least two of these polymers.

17. A biaxially oriented opaque polyolefin multilayer film which can be sealed on both sides, comprising a base layer and two surface layers, one on each side of the base layer, the base layer consisting essentially of a propylene polymer with an additive that is incompatible with the propylene polymer, a first surface layer consisting essentially of a polyolefinic sealable raw material containing a polydialkylsiloxane incorporated within the layer as a lubricant, and a second surface layer consisting essentially of a sealable polyolefinic material having, on its outer surface, polydialkylsiloxane as a lubricant, in a relative occupancy of not more than about 15, as determined with the aid of ESCA spectroscopy, wherein said second surface layer has been subjected to corona discharge and is printable.

18. A biaxially oriented opaque polyolefin multilayer film which can be sealed on both sides, comprising a base layer and two surface layers, one on each side of the base layer, the base layer comprising a propylene polymer with an additive that is incompatible with the propylene polymer, a first surface layer comprising a polyolefinic sealable raw material containing a polydialkylsiloxane incorporated within the layer as a lubricant, and a second surface layer comprising a sealable polyolefinic material having, on its outer surface, polydialkylsiloxane as a lubricant, in a relative occupancy of not more than about 15, as determined with the aid of ESCA spectroscopy, wherein said second surface layer has been subjected to corona discharge and is printable and wherein said polydialkylsiloxane on said outer surface of said second layer is formed by contact of said first and second sealing layers.

19. A biaxially oriented opaque polyolefin multilayer film which can be sealed on both sides, produced by the steps of:

coextruding a base layer and two surface layers, the base layer comprising a propylene polymer and an additive that is incompatible with the propylene polymer, the first surface layer comprising a polyolefinic salable raw material containing a polydialkylsiloxane incorporated within the layer as a lubricant, and the second surface layer consisting essentially of a polyolefinic sealable raw material;

cooling and solidifying the coextruded film;

biaxially stretching the cooled, solidified film;

heat setting the film;

corona treating the second surface layer; and winding up the film.

* * * * *

UNITED STATES PATENT AND TRADEMARK OFFICE
CERTIFICATE OF CORRECTION

PATENT NO. : 4,983,447

DATED : Jan. 8, 1991

INVENTOR(S) : Guenther CRASS et al.

It is certified that error appears in the above-identified patent and that said Letters Patent is hereby corrected as shown below:

Column 12, line 16, "face of said second layer" should read --face of said second surface layer--.

Signed and Sealed this

Fourteenth Day of September, 1993

Attest:

BRUCE LEHMAN

Attesting Officer     Commissioner of Patents and Trademarks